United States Patent [19]
Whiting

[11] Patent Number: 4,745,876
[45] Date of Patent: May 24, 1988

[54] DIFFERENTIAL PRESSURE RESPONSIVE INDICATING DEVICE

[75] Inventor: James C. Whiting, Royal Oak, Mich.

[73] Assignee: Facet Enterprises, Inc., Tulsa, Okla.

[21] Appl. No.: 800,085

[22] Filed: Nov. 21, 1985

Related U.S. Application Data

[63] Continuation of Ser. No. 570,279, Jan. 12, 1984, abandoned.

[51] Int. Cl.$^4$ .............................................. G01L 19/12
[52] U.S. Cl. ................................... 116/268; 116/267; 116/DIG. 42
[58] Field of Search ............... 116/267, 216, 268, 272, 116/266, 220, 218, DIG. 42, DIG. 25, DIG. 7; 200/82 E, 82 R, 82 D, 81.9 M, 81 R; 60/527; 148/402, 11.5 R, 11.5 C; 210/90

[56] References Cited

U.S. PATENT DOCUMENTS

| | | | |
|---|---|---|---|
| 2,942,572 | 6/1960 | Pall | 116/267 |
| 3,077,854 | 2/1963 | Pall | 116/267 |
| 3,125,062 | 3/1964 | Raupp | 116/267 |
| 3,403,238 | 9/1968 | Buehler | 60/527 |
| 3,442,248 | 5/1969 | Parkinson | 116/267 |
| 3,483,752 | 12/1969 | Rogen | 116/216 |
| 3,495,566 | 2/1970 | Pall | 116/267 |
| 3,595,200 | 7/1971 | Cilento | 116/DIG. 42 |
| 3,974,795 | 8/1976 | Crisp | 116/267 |
| 4,398,969 | 8/1983 | Melton | 148/402 |
| 4,435,229 | 3/1984 | Johnson | 148/402 |
| 4,490,976 | 1/1985 | Johnson | 60/527 |
| 4,533,411 | 8/1985 | Melton | 148/402 |

OTHER PUBLICATIONS

Kubel, Jr., Edward J. "Shape Memory Metal", *Material Engineering*, Jun. 1984.
PCT Pub. No.: WO81/02587; PCT Pub. date Sep. 17, 1981; Melton.

Primary Examiner—William A. Cuchlinski, Jr.
Assistant Examiner—W. Morris Worth
Attorney, Agent, or Firm—Remy J. VanOphem

[57] ABSTRACT

A temperature compensating differential pressure indicating device having a lock-out feature requiring internal reset after actuation. The differential pressure responsive indicating device includes a case having an internal chamber and a piston reciprocably and sealingly disposed in the internal chamber. A piston follower is also reciprocably disposed in the internal chamber and abuts against the piston. A first biasing element biases the piston and the piston follower in a first direction while a second biasing element biases these components in the opposite direction, the second biasing element being weaker than the first biasing element. The piston is displaceable in response to the pressure differential between an inlet pressure and an outlet pressure. A shape memory alloy temperature responsive abutment permits the piston follower to move together with the piston at or above a predetermined temperature, while preventing motion of the piston follower below the predetermined temperature. An indicator is provided which indicates, by displacement, the displacement of the piston follower beyond a predetermined axial position, thus indicating that the predetermined pressure differential and the predetermined temperature have been simultaneously exceeded.

19 Claims, 2 Drawing Sheets

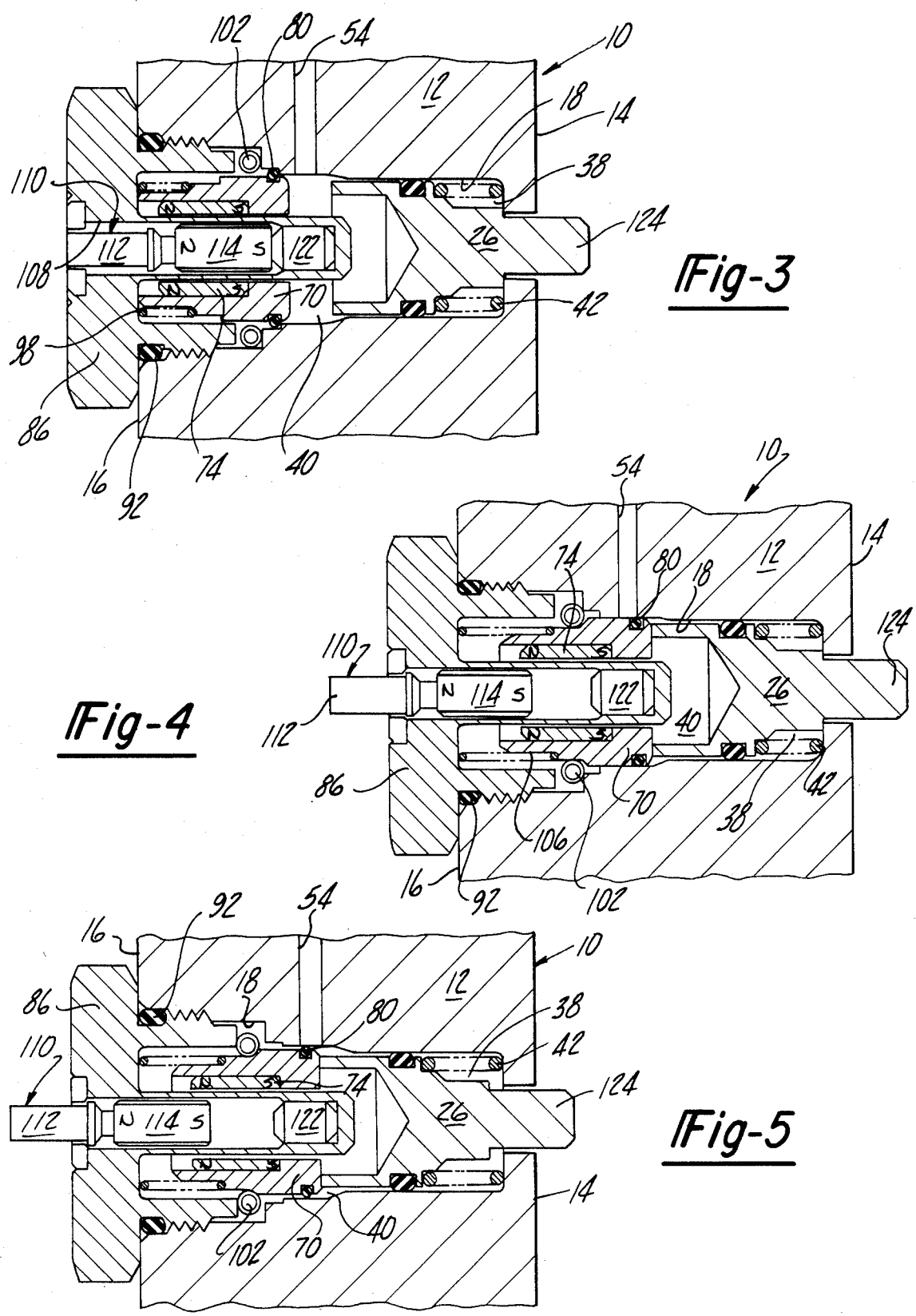

DIFFERENTIAL PRESSURE RESPONSIVE INDICATING DEVICE

This is a continuation of application Ser. No. 570,279, filed Jan. 12, 1984, now abandoned.

BACKGROUND OF THE INVENTION

The present invention relates to differential pressure responsive indicators and more particularly to indicators which are temperature sensitive so as to prevent operation at low temperatures. The present invention further relates to such indicators which provide an internal reset feature.

In hydraulic systems wherein fluids such as oils or the like are passed through a filter, it is desirable to provide an external mechanism for indicating when the filter element has become clogged and requires replacement. Since the pressure drop across a filter increases in proportion to the accumulation of dirt therein, a suitable indication may be obtained by utilizing a differential pressure device set to be actuated when the pressure drop in the filter reaches a predetermined value. There are several known prior art devices which provide external means for indicating the clogging of the filter element and which compensate for low temperature operation, so that a false clogging signal is not indicated at low fluid temperatures.

One such design is shown in U.S. Pat. No. 2,942,572, to David Pall, issued June 28, 1960. In this device, a first magnetic element is arranged to attract a second magnetic element as long as the two elements are separated by less than a predetermined distance. A biasing mechanism propels the second magnetic element to an indicating position whenever the predetermined distance is exceeded. The first magnetic element is movable reciprocally with a piston responsive to changes in pressure, and is normally biased towards the second magnetic element by a predetermined force. The second magnetic element is also movable reciprocally with a piston. While the second magnetic element is retained towards the first magnetic element by magnetic attraction when close enough to it, it is normally biased in a direction away from the first magnetic element. The biasing force is capable of overcoming the force of magnetic attraction whenever the first and second magnetic elements are separated by the predetermined distance. The magnitude of the force of the magnetic attraction, relative to the spring biasing force, determines the predetermined pressure differential at which the device is actuated. In order to prevent actuation at low temperatures, a bimetallic strip is positioned to prevent motion of the second magnetic element when the temperature is below a predetermined value. The bimetallic strip includes two arcuate strip portions which are joined by a weld. The bimetallic strip contracts inwardly at low temperatures so that the inner strip extends over a flange, thus preventing actuation of the pressure indicator. Thus, the bimetallic strips are subjected to severe stresses at low temperatures. This leads to the eventual fatiguing of the bimetallic elements and failure of the pressure indicator. In addition, this device is complex and expensive to make.

Cole, in U.S. Pat. No. 3,117,550, issued Jan. 14, 1964, owned by the Assignee of the present application, discloses a temperature sensitive differential pressure indicating device which includes an elastically unstable element. The elastically unstable element consists of a spherically or conically shaped bimetallic disk which s held and sealed along its periphery so that the resultant force acting on the disk from the pressure differential will be in the direction tending to cause the disk to flatten out. When a predetermined pressure and temperature combination is reached, however, the disk will suddenly invert with considerable force and will stay inverted until manually reset or automatically reset when the actuation pressure is released. This device is also complex, requiring precise calibration of the disk to respond to the pressure and temperature combination.

Juhasz, in U.S. Pat. No. 3,812,816, discloses a differential pressure indicator with a thermally sensitive element. The device has a pressure sensitive mechanism and an indicator operatively associated with it. The pressure sensitive mechanism moves under the influence of a differential pressure generated in a fluid handling system to allow a suitable indication when a certain pressure differential exists over the parts of the system. The device further has a locking mechanism which insures that the indication will remain until the causes of pressure differential are corrected. The device also contains a temperature sensitive element in the form of a bimetallic coil strip which, at one end, is fastened to a piston body and, at the other end, is fastened to a head shank and a head, such as to rotatably drive the head. As the fluid temperature increases, the head is moved in a counterclockwise rotation by the expanding bimetallic strip until notches or cam surfaces are moved into a position behind the locking balls. The locking balls are then free to withdraw from partial engagement with a slot to enable the piston to freely move in response to any fluid differential pressure, so long as the fluid temperature is maintained at a preselected level. This design is also complex, requiring precision machining of the parts in order to form the locking mechanism.

Other devices, such as that disclosed in U.S. Pat. No. 3,974,795, use bimetallic elements and try to prevent the movement of a piston when the piston is subjected to the high pressure differentials due to cold fluid. This eventually leads to overstressing the parts with the eventual failure of the bimetallic elements.

All of the aforesaid prior art devices are complex. Many require expensive components, such as bimetallic elements. In all of the prior art devices, the thermal element is isolated from the working fluid.

It is also sometimes desirable to provide means for resetting of an indicating device internally when the filter has been replaced. Nonetheless, it is desired to prevent resetting of the device externally, so as to provide some degree of assurance, prior to resetting, that the filter has in fact been cleaned or replaced when the indicator is reset.

There are some existing devices which attempt to accomplish these results together, but unfortunately, they have functional limitations which result in either premature actuation or no actuation at all, depending on the conditions which are present.

What is needed, therefore, is a differential pressure responsive indicating device which combines the feature of a temperature sensing device, to prevent operation at low temperature, with an internal reset feature. Such a device should be reliable so as to prevent inadvertent operation when no clogging in fact exists in the filter since the reset is internal. Nonetheless, such a device should accurately indicate an actual clogging condition so as to prevent damage to other components, which might otherwise result from the clogging of the filter.

SUMMARY OF THE INVENTION

The present invention is directed to providing a differential pressure responsive indicating device having an internal reset and a temperature sensing device to prevent operation at low temperatures.

The differential pressure responsive indicating device of the present invention includes a case having one end and an opposite end and an internal chamber disposed therebetween. A piston is movably and sealingly provided in the internal chamber and divides the internal chamber into a first compartment adjacent the one end and a second compartment adjacent the opposite end. A first and a second passage are provided for interconnecting an input pressure with the first compartment and an output pressure with the second compartment, respectively. A first biasing devices is provided between the piston and the case which biases the piston towards the one end. The piston, therefore, is displaceable in the internal chamber in response to the pressure differential between the input pressure and the output pressure.

A piston follower is provided within the first compartment and abuts the piston. A second biasing device is provided between the case and the piston follower and biases the piston follower towards the opposite end. A shape memory alloy temperature responsive abutment element is provided between the piston follower and the case. The temperature responsive abutment element prevents displacement of the piston follower towards the opposite end when the temperature in the internal chamber is below a predetermined temperature level and permits the displacement of the piston follower when the temperature in the internal chamber is above that predetermined temperature level such that, above the predetermined temperature level, the piston follower is displaceable by the second biasing means from its initial position to a displaced position against the piston. A second abutment element is provided to removably latch the piston follower in a displaced position when the piston follower is displaced a predetermined amount towards the opposite end of the case. A reset member extends from the piston through the opposite end of the case and is selectively operable to reset the piston follower to its initial position.

An indicator is movably disposed in the case and is selectively displaceable to protrude through the one end of the case in response to displacement of the piston follower the above predetermined distance towards the opposite end of the case.

The primary object of the present invention is to provide a reliable differential pressure responsive indicating device including an internal reset and a temperature sensing device to prevent operation of the differential pressure responsive indicating device at low temperatures.

It is another object of the present invention to provide a device which indicates excessive pressure differential between an inlet and an outlet. The device also provides an indicator thermal lockout, which directly measures the actual temperature of the fluid and, yet, when subjected to high pressure drops due to low temperature fluids, permits the piston to travel to a second position while leaving the indicator mechanism in the nonindicating position.

It is still another object of the present invention to provide a device which indicates an excessive differential pressure between an inlet and an outlet, the device including a temperature sensitive element to compensate for extreme pressure drops due to cold fluid temperatures, wherein false indications due to shock or vibrations when the pressure differential is near the predetermined level may be detected.

The foregoing and other objects, features and advantages of the present invention will become apparent to those skilled in the art when the following detailed description of the preferred embodiment is read together with the drawings attached hereto.

BRIEF DESCRIPTION OF THE DRAWINGS

The attached drawings depict the preferred embodiment of the present invention. In the attached drawings, like reference numerals refer to like components throughout and further:

FIG. 3 is a sectional view similar to FIG. 1 but illustrates the differential pressure responsive indicating device when a substantial pressure differential is indicated at a low temperature condition;

FIG. 4 is a sectional view similar to FIGS. 1 and 3 and illustrates a high pressure differential condition together with a high temperature condition;

FIG. 5 is a sectional view similar to FIGS. 1, 3 and 4 and illustrates the differential pressure responsive indicating device after a combined high pressure differential and high temperature condition has occurred and no longer exists.

DETAILED DESCRIPTION OF THE PREFERRED EMBODIMENT

Figure 1:
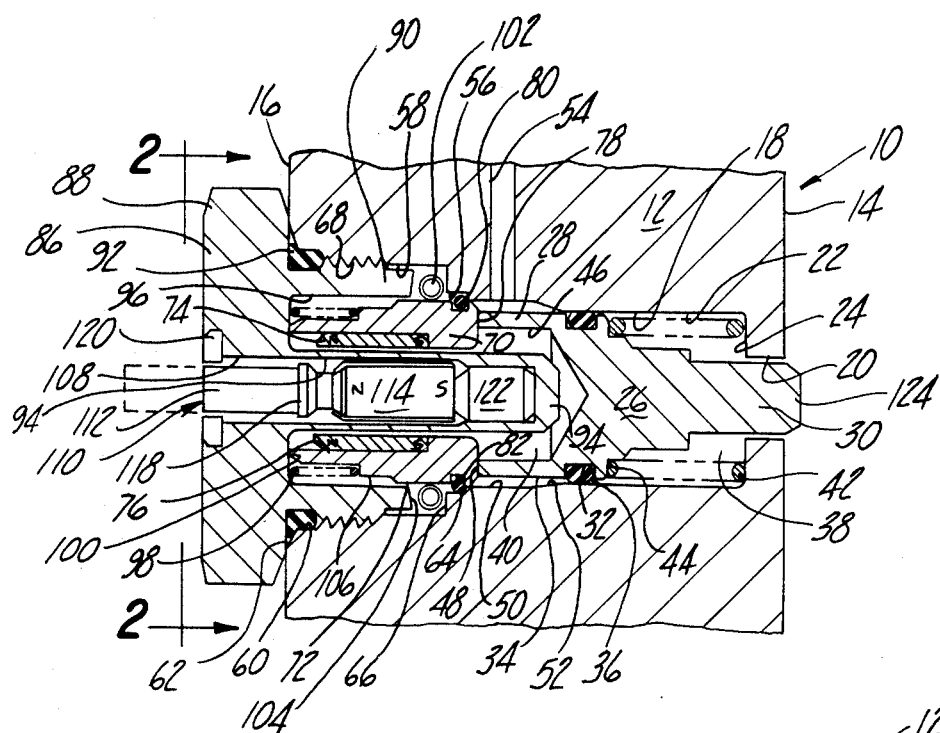
FIG. 1 illustrates a side sectional view of the differential pressure responsive indicating device of the present invention.

Referring now to the drawings illustrating an example of the differential pressure responsive indicating device 10 according to the present invention, and more particularly to FIG. 1 thereof, the differential pressure responsive indicating device 10 includes a case 12 having one end 14 and an opposite end 16. A compound passageway 18 extends from the one end 14 to the opposite end 16 of the case 12 and is formed by a bore and a series of counterbores, each described below in detail, increasing in diameter from the one end 14 towards the opposite end 16.

The compound passageway 18 has a first bore 20 extending from the one end 14 to the opposite end 16. A first counterbore 22, coaxial with the first bore 20, extends from the opposite end 16 partially towards the one end 14. An annular shoulder 24 is thereby formed between the first bore 20 and the first counterbore 22.

A primary piston 26 is reciprocally disposed in the compound passageway 18. The primary piston 26 has an enlarged portion or head 28 slidably disposed at least partially in the first counterbore 22 and an elongated portion or plunger 30 extending coaxially from the head 28 through the first bore 20 and terminating in a reset end 124. An annular channel 32 is formed in an outer cylindrical surface 34 of the head 28 of the primary piston 26. An O-ring 36 is provided in the annular channel 32 and cooperates with the inner cylindrical surface of the first counterbore 22 to form a sliding seal between the head 28 and the case 12. The primary piston 26 thereby sealingly divides the compound passageway 18 into a first sealed compartment 38 adjacent the one end 14 of the case and a second compartment 40 adjacent the opposite end 16 thereof. A coil spring 42 is provided in the first sealed compartment 38 between the annular shoulder 24 of the case 12 and a similar annular shoulder 44 formed between the head 28 and the plunger 30 of the primary piston 26. The coil spring 42 biases the primary piston 26 towards the opposite end 16 of the case 12.

A clearance, bore 46 coaxial with the compound passageway 18, is formed in the head 28 of the primary piston 26 in a location opposite the plunger 30 for a purpose to be described later herein. The head 28 has an annular abutment surface 48 around the clearance bore 46, also for a purpose to be described later.

The compound passageway 18 further includes a second counterbore 50 having a larger diameter than the first counterbore 22 and extending from the opposite end 16 of the case 12 partially towards the annular shoulder 24. A frusto-conical surface 52 is formed between the first counterbore 22 and the second counterbore 50. A passageway 54 is formed in the case 12 and extends from a high pressure source to the second counterbore 50, thereby communicating the high pressure source with the second sealed compartment 40.

The compound passageway 18 further has a third counterbore 56, a fourth counterbore 58, a fifth counterbore 60, and a frusto-conical counterbore 62, of progressively larger diameters extending between the second counterbore 50 and the opposite end 16. Annular shoulders 64 and 66, respectively, are formed between the third counterbore 56 and each of the second and fourth counterbores 50 and 58. An internal thread 68 is provided in the portion of the fourth counterbore 58 adjacent the fifth counterbore 60.

A piston follower sleeve 70, having an outer cylindrical surface 72 of smaller diameter than the second counterbore 50, is provided in the second sealed compartment 40. The piston follower sleeve is provided with an annular magnet 74 fitted against an inner cylindrical surface 76 thereof. The annular magnet 74 is provided with a suitable north pole and south pole, as indicated in the drawing. The piston follower sleeve 70 further has a forward annular surface 78 engageable with the annular abutment surface 48 of the primary piston 26.

A split ring 80 is interposed between the piston follower sleeve 70 and the case 12. The split ring 80 is formed from a shape memory alloy wire. The split ring 80 is fitted into an annular groove 82 in the outer cylindrical surface 72 of the piston follower sleeve 70. The outer diameter of the annular groove 82 is preselected to be equivalent to or greater than the inner diameter of the split ring 80. The split ring 80 is heat processed to a predetermined inside diameter and is reshaped at low temperature to a slightly larger diameter such that the reshaped outer diameter of the split ring is larger than the inner diameter of the second counterbore 50. Thus, at a low temperature, the split ring 80 cooperates with the annular shoulder 64 to prevent the movement of the piston follower sleeve 70 towards the one end 14 of the case 12. However, it is a characteristic of the shape memory alloy material that, upon heating to a particular predetermined temperature, the material reverts to its original shape. Accordingly, upon the heating of the fluid in the second sealed compartment 40 to a predetermined temperature level, the split ring 80 will retract into the annular groove 82 to an outer diameter smaller than the inner diameter of the second counterbore 50 and, thereby, permit movement of the piston follower sleeve 70 towards the one end 14 of the case 12. The split ring 80 is proportioned such as to protrude no more than one half of its diameter from the annular groove 82 so that it will not jam when attempting to contract into the annular groove. Therefore, the piston follower sleeve 70 will only follow the motion of the primary piston when a temperature in excess of the predetermined temperature exists in the second sealed compartment 40.

The differential pressure responsive indicating device 10 of the present invention further includes an end cap 86 having a head portion 88 and an externally threaded annular flange 90 extending coaxially therefrom. The externally threaded annular flange 90 is threaded into the internal thread 68 in the fourth counterbore 58. The externally threaded annular flange 90 is thereby inserted into the annular gap between the fourth counterbore 58 and the outer cylindrical surface 72 of the piston follower sleeve 70. An O-ring 92 is provided around the portion of the annular flange 90 adjacent the head portion 88 and cooperates with the fifth counterbore 60 and the frusto-conical counterbore 62 to form a seal therebetween sealingly closing the second sealed compartment 40. The end cap 86 further has a cylindrical extension 94 extending coaxially with the annular flange 90 through the center of the piston follower sleeve 70 and partially into the clearance bore 46 in the primary piston 26. An annular recess 96 is, thus, formed between the cylindrical extension 94 and the externally threaded annular flange 90 of the end cap 86, the piston follower sleeve 70 being disposed in the annular recess 96. Biasing means, such as a spring 98, are provided between the base 100 of the annular recess 96 and the piston follower sleeve 70, such as to bias the piston follower sleeve 70 towards the one end 14 of the case 12.

A garter spring 102 is provided around the outer cylindrical surface 72 of the piston follower sleeve 70. The garter spring 102 is generally trapped between a forward annular surface 104 of the annular flange 90 and the annular shoulder 66 of the case 12. The piston follower sleeve 70 is provided with a recessed cylindrical surface 106 adjacent the end cap 86. Thus, if the piston follower sleeve 70 is displaced towards the one end 14 of the case 12 beyond a predetermined distance, the garter spring 102 encounters the recessed cylindrical surface 106 and contracts therein. In this position, the garter spring 102 inhibits a returning motion of the piston follower sleeve 70 towards the opposite end 16 of the case 12.

The end cap 86 is further provided with a bore 108 coaxial with the externally threaded annular flange 90 and the cylindrical extension 94. The bore 108 extends partially from the head portion 88 into the cylindrical extension 94. A secondary piston 110 is reciprocally provided in the bore 108. The secondary piston 110 includes an indicator pin 112 and a cylindrical magnet 114 interconnected therewith and extending axially therefrom. The magnet 114 has suitable north and south poles as indicated in the drawing. The indicator pin 112 is provided with an abutment 118 which cooperates with a first abutment member 120 interconnected with the head portion 88 of the end cap 86. A second abutment member 122 is pressed into the base of the bore 108. The second abutment member 122 is preferably a slug and is used to increase the shock resistance of the indicator pin as described in U.S. Pat. No. 3,128,743.

Thus, the secondary piston 110 is reciprocable within the bore 108 between a first extreme position and a second extreme position. In the first extreme position, shown in solid line in FIG. 1, the indicator pin 112 abuts the second abutment member 122. In the second extreme position, shown in dashed line in FIG. 1, the abutment 118 formed on the indicator pin 112 engages the first abutment member 120. In the first extreme position, the indicator pin 112 is entirely disposed within the bore 108, while in the second extreme position, a portion of the indicator pin extends outwardly therefrom.

The operation of the above described device is as follows.

The initial position of all of the elements of the differential pressure responsive indicating device 10 of the present invention is indicated in FIG. 1. The primary piston 26 is biased by the spring 42 against the piston follower sleeve 70 which in turn is biased against the base 100 of the annular recess 96 in the end cap 86, the spring 42 being stronger than the spring 98.

As shown in FIG. 3, during cold start-up, a high pressure differential between the first sealed compartment 38 and the second sealed compartment 40 will initially cause the primary piston 26 to be displaced against the force of the spring 42, towards the one end 14 of the case 12. However, the split ring 80 prevents the piston follower sleeve 70 from following the motion of the primary piston 26.

As the system warms up, if the filtering element is not contaminated, the pressure differential will be decreased and the primary piston 26 will return towards the opposite end 16 of the case 12.

However, as illustrated in FIG. 4, if the pressure differential does not decrease sufficiently, once the system warms up, the split ring 80 will deflect due to the temperature change in the second sealed compartment 40 and, accordingly, will contract into the annular groove 82. Once the split ring 80 contracts, the piston follower sleeve 70 is free to follow the primary piston 26. If the pressure differential is sufficient so as to displace the piston follower sleeve beyond a predetermined distance towards the one end 14 of the case 12, the garter spring 102 will encounter and engage the recessed cylindrical surface 106 of the piston follower sleeve 70. It should be noted that if the piston follower sleeve 70 is not displaced sufficiently to permit the engagement of the garter spring 102 in the recessed cylindrical surface, the piston follower sleeve will be free to return to its original rest position when the pressure differential is alleviated. However, once the garter spring engages the recessed cylindrical surface 106, the piston follower sleeve 70 may not be returned to its original position without partial disassembly of the device.

As the piston follower sleeve 70 is displaced, the magnetic poles of the annular magnet 74 coact with the magnetic poles of the cylindrical magnet 114 to shift the secondary piston 110, as illustrated in FIGS. 4 and 5, to indicate a critical pressure differential situation. If a false reading has occurred, that is, if the piston follower sleeve has not been blocked against return motion by the garter spring 102, the differential pressure responsive indicating device 10 may be reset by manual depression of the indicator pin 112. However, once the garter spring has engaged the recessed cylindrical surface 106, the piston follower sleeve 70 will be locked in a position constantly biasing the indicator pin 112 in the indicating position, even after the hydraulic system has been shut down.

Thus, the differential pressure responsive indicating device of the present invention will not indicate the need to change the filter as a result of the temporary pressure differential, which may occur during the start-up of operation. However, once a failed filter is, in fact, accurately detected, the unit may only be reset gaining access to the reset end 124 of the plunger 30 of the primary piston 26. If sufficient force is applied to the reset end 124 of the primary piston 26, the resistance of the garter spring 102 is overcome and the primary piston 26 and the piston follower sleeve 70 return to their initial positions. The force necessary to prevent self-resetting is a function of the garter spring tension, the sliding friction between elements, and the angles of the steps between the various surfaces encountering the garter spring 102. Once the primary piston 26 has been returned to its original position, the secondary piston 110 may be reset externally.

Figure 6:
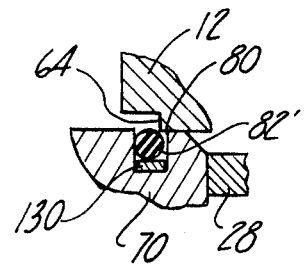
FIG. 6 is a partial view of a pressure responsive indicating device similar to that of FIGS. 1 through 5 but illustrating a modification therefrom.
Figure 2:
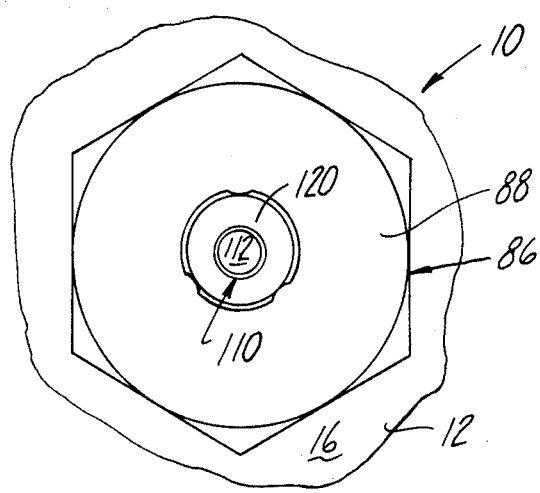
FIG. 2 is an end view taken along line 2—2 of FIG. 1 and illustrates the external visible portion of the differential pressure responsive indicating device of the present invention.

FIG. 6 of the drawing illustrates a modification of the differential pressure responsive indicating device 10 according to the present invention for use when operating under conditions of close temperature limits. A helper spring 130 is provided in the base of an annular groove 82', which is deeper than the annular groove 82 described above. The helper spring 130 assists the extending the split ring 80 at low temperatures. At higher temperatures the split ring 80 will overcome the biasing force of the helper spring 130 and retract into the annular groove 82'.

The above detailed description of the preferred embodiment constitutes the best mode contemplated by the inventor at the time of the filing. It will be appreciated by those skilled in the art that variations and modifications may be made for the structure described above and to the operation of the structure, within the spirit of the present invention. For example, the principle may also be applied to a device having a diaphragm or bellows as the pressure sensing element, rather than a piston operated device. Similarly, the temperature sensitive wire ring may be on an internal or external groove. These and the many other modifications and variations within the spirit of the present invention are included within the intended scope of the claims appended hereto.

What is claimed as novel is as follows:

1. A device for indicating a predetermined pressure differential between an inlet pressure and an outlet pressure, said device comprising:
   a case having one end and an opposite end;
   an internal chamber formed in said case, said internal chamber having a central axis;
   a pressure responsive member disposed within said internal chamber, said pressure responsive member being reciprocable within said internal chamber along said central axis, said pressure responsive member sealingly dividing said internal chamber into a first compartment adjacent said one end and a second compartment adjacent said opposite end;
   a first passage means in said case communicating with said outlet pressure and extending into said first compartment of said internal chamber;

a second passage means in said case communicating with said inlet pressure and extending into said second compartment of said internal chamber;

first biasing means disposed in said first compartment and interposed said case and said pressure responsive member, said first biasing means exerting a first predetermined force on said pressure responsive member such as to bias said pressure responsive member towards said opposite end and further such that when a predetermined pressure differential exists between said first compartment and said second compartment, said predetermined pressure differential overcomes said first predetermined force of said first biasing means to displace said pressure responsive member in said internal chamber towards said one end;

a follower member movably disposed in said second compartment and having a portion abutting said pressure responsive member, said follower member being reciprocable within said second compartment along said central axis, said follower member being biased by said first biasing means and said pressure responsive member to an initial position adjacent said opposite end;

second biasing means disposed in said second compartment, said second biasing means being interposed said case and said follower member, said second biasing means biasing said follower member towards said one end of said case and against said pressure responsive member, said second biasing means exerting a second predetermined force on said follower member, said second predetermined force being less than said first predetermined force;

reversible shape memory alloy temperature responsive abutment means interposed said case and said follower member, said reversible shape memory alloy temperature responsive abutment means being responsive to the temperature in said second compartment, said reversible shape memory alloy temperature responsive abutment means preventing motion of said follower member towards said one end when the temperature in said second compartment is below a predetermined temperature and permitting said motion when the temperature in said second compartment is above said predetermined temperature; and indicator means for indicating that said follower member has moved, such that when said follower member has been displaced a predetermined amount towards said one end, said indicator means moves from a non-indicating position to an indicating position.

2. The device of claim 1 wherein said indicator means is centrally disposed in said internal chamber and further wherein a portion of said indicator means protrudes through said opposite end of said case in said nonindicating position.

3. The device of claim 1 further comprising latch means removably latching said follower member in a shifted position when said follower member has been displaced a predetermined amount towards said one end.

4. The device of claim 3 further comprising reset means interconnected with said pressure responsive member and extending therefrom through an aperture in said one end of said case, such that said follower member may be reset to said initial position by an external application of pressure to said reset means, such as to overcome said latch means.

5. The device of claim 4 wherein said first passage means comprises said aperture in said one end.

6. The device of claim 3 wherein said latch means further comprises:

first recess means in said case pening into said second compartment of said internal chamber;

second abutment means disposed in said first recess means and biased against said follower member; and second recess means in said follower member, said second recess means being automatically engageable with said second abutment means when said follower member is shifted said predetermined distance towards said one end.

7. The device of claim 1 wherein said first biasing means comprises a coil spring.

8. The device of claim 1 wherein said second biasing means comprises a coil spring.

9. The device of claim 1 wherein said indicator means further comprises:

a first magnet interconnected with said follower member, said first magnet having a first magnetic pole disposed towards said one end of said case and a second magnetic pole disposed towards said opposite end of said case, said first and second magnetic poles generating first magnetic flux lines; and a second magnet movably interconnected with said case, said second magnet being disposed adjacent said first magnet, said second magnet having a third magnetic pole disposed towards said one end of said case and a fourth magnetic pole disposed adjacent said opposite end of said case, said third and fourth magnetic poles generating second magnetic flux lines such that, when said first magnet is moved towards said one end of said case, said first magnetic flux line of said first magnet repel said second magnetic flux lines of said second magnet such as to move said second magnet to indicate that said follower member has moved said predetermined amount towards said one end.

10. The device of claim 1 wherein said reversible shape memory alloy temperature responsive abutment means further comprises:

an abutment fixed in said case; and a reversible shape memory alloy temperature responsive abutment member interconnected with said follower member, said reversible shape memory alloy temperature responsive abutment member being displaceable, in response to the temperature in said second compartment, towards and away from engagement with said abutment fixed in said case.

11. A device for indicating a predetermined pressure differential between an inlet pressure and an outlet pressure, said device comprising:

a case having one end and an opposite end;

an internal chamber formed in said case, said internal chamber having a central axis;

a piston centrally disposed within said internal chamber, said piston being reciprocable within said internal chamber along said central axis, said piston further having an elarged head portion sealingly engagin said case such that said piston sealingly divides said internal chamber into a first compartment adjacent said one end and a second compartment adjacent said opposite end;

a first passage means in said case communicating with said outlet pressure and extending into said first compartment of said internal chamber;

a second passage means in said case communicating with said inlet pressure and extending into said second compartment of said internal chamber;

first biasing means disposed in said first compartment and interposed said case and said piston, said first biasing means exerting a first predetermined force on said piston such as to bias said piston towards said opposite end and further such that when a predetermined pressure differential exists between said first compartment and said second compartment, said predetermined pressure differential oversomes said first predetermined force of said first biasing means to displace said piston in said internal chamber towards said one end;

a piston follower movably disposed in said second compartment and having a portion abutting said piston, said piston follower being reciprocable within said second compartment along said central axis, said piston follower being biased by said first biasing means and said piston to an initial position adjacent said opposite end;

second biasing means disposed in said second compartment, said second biasing means being interposed said case and said piston follower, said second biasing means biasing said piston follower towards said one end of said case and against said pistion, said second biasing means exerting a second predetermined force on said piston follower, said second predetermined force being less than said first predetermined force;

reversible shape memory alloy temperature responsive abutment means interposed said case and said piston follower, said reversible shape memory alloy temperature responsive abutment means being responsive to the temperature in said second compartment, said reversible shape memory alloy temperature responsive abutment means preventing motion of said piston follower towards said one end when the temperature in said second compartment is below a predetermined temperature and permitting said motion when the temperature in said second compartment is above said predetermined temperature;

latch means removably latching said piston follower in a shifted position when said piston follower has been displaced a predetermined amount towards said one end; and indicator means centrally disposed in said internal chamber for indicating that said pistion follower has moved, such that when said pistion follower has been displaced a predetermined amount towards said one end, said indicator means moves from a non-indicating position within said internal chamber to an indicating position protruding through said opposite end of said case.

12. The device of claim 11 further comprising reset means interconnected with said piston and extending therefrom through an aperture in said one end of said case, such that said piston follower may be reset to said initial position by an external application of pressure to said reset means, such as to overcome said latch means.

13. The device of claim 12 wherein said second passage means comprises said aperture in said one end.

14. The device of claim 12 wherein said latch means further comprises:

first recess means in said case opening into said second compartment of said internal chamber;

second abutment means disposed in said first recess means and biased against said piston follower; and second recess means in said piston follower, said second recess means being automatically engageable with said second abutment means when said piston follower is shifted said predetermined distance towards said one end.

15. The device of claim 11 wherein said indicator means further comprises:

a first magnet interconnected with said piston follower, said first magnet having a first magnetic pole disposed towards said one end of said case and a second magnetic pole disposed towards said opposite end of said case, said first and second magnetic poles generating first magnetic flux lines; and a second magnet movably interconnected with said case, said second magnet being disposed adjacent said first magnet, said second magnet having a third magnet pole disposed towards said one end of said case and a fourth magnetic pole disposed adjacent said opposite end of said case, said third and fourth magnetic poles generating second magnetic flux lines such that, when said first magnet is moved towards said one end of said case, said first magnetic flux lines of said first magnet repel said second magnetic flux lines of said second magnet such as to move said second magnet to indicate that said piston follower has moved said predetermined amount towards said one end.

16. The device of claim 12 wherein said reversible shape memory alloy temperature responsive abutment means comprises:

an abutment fixed in said case; and a reversible shape memory alloy temperature responsive abutment means interconnected with said piston follower, said reversible shape memory alloy temperature responsive abutment means being displaceable in response to the temperature in said internal chamber towards and away from engagement with said abutment fixed in said case.

17. A device for indicating a predetermined pressure differential between an inlet pressure and an outlet pressure, said device comprising:

a case having one end and an opposite end;

an internal chamber formed in said case, said internal chamber having a central axis;

a piston centrally disposed within said internal chamber, said piston being reciprocable within said internal chamber along said central axis, said piston further having an enlarged head portion sealingly engaging said case such that said piston sealingly divides said internal chamber into a first compartment adjacent said one end and a second compartment adjacent said opposite end;

a first passage means in said case communicating with said outlet pressure and extending into said first compartment of said internal chamber;

a second passage means in said case communicating with said inlet pressure and extending into said second compartment of said internal chamber;

first biasing means disposed in said first compartment and interposed said case and said piston, said first biasing means exerting a first predetermined force on said piston such as to bias said piston towards said opposite end and further such that when a predetermined pressure differential exists between said first compartment and said second compartment, said predetermined pressure differential overcomes said first predetermined force of said first biasing means to displace said piston in said internal chamber towards said one end;

a piston follower movably disposed in said second compartment and having a portion abutting said piston, said piston follower being reciprocable within said second compartment along said central axis, said piston follower being biased by said first biasing means and said piston to an initial position adjacent said opposite end;

second biasing means disposed in said second compartment, said second biasing means being interposed said case and said piston follower, said second biasing means biasing said piston follower towards said one end of said case and against said piston, said second biasing means exerting a second predetermined force on said piston follower, said second predetermined force being less than said first predetermined force;

reversible shape memory alloy temperature responsive abutment means interposed said case and said piston follower, said reversible shape memory alloy temperature responsive abutment means being responsive to the temperature in said second compartment, said reversible shape memory alloy temperature responsive abutment means preventing motion of said piston follower towards said one end when the temperature in said second compartment is below a predetermined temperature and permitting said motion when the temperature in said second compartment is above said predetermined temperature;

latching means for locking said piston follower in a shifted position after said piston follower has shifted a predetermined amount towards said opposite end, said latching means being operative to hold said piston follower in said shifted position after said predetermined pressure differential no longer exists between said first and second compartments;

reset means interconnected with said piston and extending therefrom through said first passage means, said reset means being operable to reset said piston follower to said initial position; and indicator means centrally disposed in said internal chamber for indicating that said piston follower has moved, such that when said piston follower has been displaced a predetermined amount towards said one end, said indicator means moves from a non-indicating position within said internal chamber to an indicating protruding through said opposite end of said case.

18. The device of claim 17 wherein said indicator means further comprises:

a first magnet interconnected with said piston follower, said first magnet having a first magnetic pole disposed towards said one end of said case and a second magnetic pole disposed towards said opposite end of said case, said first and second magnetic poles generating first magnetic flux lines; and a second magnet movably interconnected with said case, said second magnet being disposed adjacent said first magnet, said second magnet having a third magnetic pole disposed towards said one end of said case and a fourth magnetic pole disposed adjacent said opposite end of said case, said third and fourth magnetic poles generating second magnetic flux lines such that, when said first magnet is moved towards said one end of said case, said first magnetic flux lines of said first magnet repel said second magnetic flux lines of said second magnet such as to move said second magnet to indicate that said portion follower has moved said predetermined amount towards said one end.

19. The device of claim 17 wherein said reversible shape memory alloy temperature responsive abutment means further comprises:

an abutment fixed in said case; and a reversible shape memory alloy temperature responsive abutment member interconnected with said piston follower, said reversible shape memory alloy temperature responsive abutment member being displaceable, in response to the temperature in said second compartment, towards and away from engagement with said abutment fixed in said case.

* * * * *

UNITED STATES PATENT AND TRADEMARK OFFICE
CERTIFICATE OF CORRECTION

PATENT NO. : 4,745,876
DATED : May 24, 1988
INVENTOR(S) : James C. Whiting

Page 1 of 2

It is certified that error appears in the above-identified patent and that said Letters Patent is hereby corrected as shown below:

Column 2, line 1, delete "s" and insert ---- is ----.

Column 5, line 16, delete "clearance," and insert ---- clearance ----.

Same line, after "46" insert a comma ---- , ----.

Column 8, line 32, delete "the", second occurrence, and insert ---- in ----.

In the Claims

Column 10, line 7, delete "pening" and insert ---- opening ----.

Column 10, line    delete "line" and insert ---- lines ----.

Column 10, line 65, delete "engagin" and insert ---- engaging ----.

Column 11, line 15, delete "oversomes" and insert ---- overcomes ----.

Column 12, line 22, delete "magnet" and insert ---- magnetic ----.

UNITED STATES PATENT AND TRADEMARK OFFICE
CERTIFICATE OF CORRECTION

PATENT NO. : 4,745,876
DATED : May 24, 1988
INVENTOR(S) : James C. Whiting

It is certified that error appears in the above-identified patent and that said Letters Patent is hereby corrected as shown below:

Column 14, line 9, after "indicating" insert ---- position ----.

Column 14, line 31, delete "portion" and insert ---- piston ----.

Signed and Sealed this

Twenty-second Day of November, 1988

Attest:

DONALD J. QUIGG

*Attesting Officer*

*Commissioner of Patents and Trademarks*